United States Patent
Edvardsson

(10) Patent No.: US 7,304,601 B1
(45) Date of Patent: Dec. 4, 2007

(54) DEVICE AND A METHOD FOR ACCURATE RADAR LEVEL GAUGING

(75) Inventor: Olov Edvardsson, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 0 days.

(21) Appl. No.: 11/516,815

(22) Filed: Sep. 7, 2006

(51) Int. Cl.
- *G01F 23/284* (2006.01)
- *G01F 23/00* (2006.01)
- *G01S 13/08* (2006.01)
- *G01S 13/00* (2006.01)

(52) U.S. Cl. .................. 342/124; 342/59; 342/118; 342/120; 342/123; 342/159; 342/175; 342/188; 342/195

(58) Field of Classification Search .......... 342/21, 342/22, 59, 118–146, 175, 188–197, 159–164; 73/290 R, 304 R, 304 C; 324/629, 637–646
See application file for complete search history.

(56) References Cited

U.S. PATENT DOCUMENTS

| | | | | |
|---|---|---|---|---|
| 1,854,122 A * | 4/1932 | Eaton | ................... | 342/120 |
| 2,116,717 A * | 5/1938 | Scharlau | ................ | 342/126 |
| 2,420,408 A * | 5/1947 | Behn | ...................... | 342/126 |
| 3,953,856 A * | 4/1976 | Hammack | ............. | 342/125 |
| 3,996,590 A * | 12/1976 | Hammack | ............. | 342/126 |
| 5,053,776 A * | 10/1991 | Mawhinney et al. | | 342/124 |
| 6,002,357 A * | 12/1999 | Redfern et al. | ........... | 342/22 |
| 6,414,627 B1 * | 7/2002 | McEwan | .............. | 342/134 |
| 6,462,705 B1 * | 10/2002 | McEwan | .............. | 342/175 |

FOREIGN PATENT DOCUMENTS

WO  03/019121 A1  3/2003

* cited by examiner

*Primary Examiner*—Bernarr E. Gregory
(74) *Attorney, Agent, or Firm*—Westman, Champlin & Kelly P.A.

(57) ABSTRACT

The invention discloses a device for using radar signals to measure the vertical distance (h) to a surface, comprising a first transmitter and a first transmitting antenna for transmitting radar signals, and a first receiver and a first receiving antenna for receiving radar signals. The device additionally comprises a second receiving antenna and a second receiver, the second receiving antenna being arranged at a first predetermined horizontal distance ($\Delta x$) from the first receiving antenna, the device also being equipped with means for using signals which have been transmitted from the first transmitting antenna and received at the first and second receiving antennas to calculate the vertical distance to the surface. Suitably, the first and second receivers are one and the same physical unit, to which both the first and the second receiving antennas are coupled.

12 Claims, 5 Drawing Sheets

DEVICE AND A METHOD FOR ACCURATE RADAR LEVEL GAUGING

TECHNICAL FIELD

The invention discloses a device for using radar signals to measure the vertical distance to a surface from said device, the device comprising a first transmitter and a first transmitting antenna for transmitting radar signals, and a first receiver and a first receiving antenna for receiving radar signals.

RELATED ART

Radar level gauging is a known method for measuring the amount of, for example, a liquid in a container such as a metallic tank. As the name implies, the method comprises radar technology: radar signals are transmitted towards the surface of the matter, liquid or otherwise, to be measured, and by means of the radar signals which are reflected from said surface, the distance to the surface from the transmitting device can be determined, thus enabling an accurate calculation of the amount of matter, liquid or other, which is present in, for example, a tank.

In many applications, the transmitted signals will be reflected not only in the surface but also in objects such as bulkheads or other objects located in the vicinity of the surface to be measured. These signals will interfere with the measurements, and are thus referred to as undesired signals, as opposed to the desired signals reflected from the surface. One known way of enabling suppression of undesired signals in favour of desired signals is to use a rather large bandwidth in the radar system, said bandwidth being employed to use so called range gating.

If radar level gauging is to be used in non-metallic tanks, from which radar energy can leak, or even in open-air applications, the level gauging system will be subject to the same frequency and bandwidth regulations as any other system which transmits electromagnetic energy, thus making it difficult or impossible to use as much bandwidth as might be necessary in order to solve the problem of suppressing undesired signals in favour of desired signals. Within most countries the so called ISM-bands (industrial, scientific & medical) are possible to use for a wide spectrum of uses but these bands are much more narrow than the bandwidth of a typical radar level gauge. 2.4-2.5 GHz, 5.8±0.075 GHz, 24.0-24.25 GHz and 61-61.5 GHz are 4 bands which might be used (with some national variations) but at least the lower frequencies have a bandwidth much more narrow than 1-1.5 GHz which is a typical bandwidth of radar level gauges on the market.

One example of an open-air application for radar level gauging is measurements of the water level in a dam or other bodies of water.

SUMMARY OF THE INVENTION

There is thus a need for a method and a device by means of which radar level gauging can be performed in an environment in which frequency or other transmission restrictions might apply, by means of which method or device signals that have been reflected from a surface which it is desired to measure the distance to can be detected in the presence of signals which have been reflected from other objects.

This need is addressed by the present invention in that it discloses a device for using radar signals to measure the vertical distance to a surface from the device. The device comprises a first transmitter and a first transmitting antenna for transmitting radar signals, as well as a first receiver and a first receiving antenna for receiving radar signals.

Additionally, the device comprises a second receiving antenna and a second receiver, said second receiving antenna being arranged at a predetermined horizontal distance from the first receiving antenna, and the device is equipped with means for using signals which have been transmitted from the first transmitting antenna and received at the first and second receiving antennas to calculate the vertical distance to the surface.

In this way, as will become even more clear from the following detailed description, signals which are reflected from interfering objects and then detected by the radar level gauging device can be suppressed in favour of signals which have been transmitted by the first transmitting antenna and received at both of the receiving antennas. In a typical embodiment the invention makes a combination of conventional distance calculation and distance calculation using the geometry and the method can be said to substitute the wide bandwidth with geometrical distance differences. It should also be said that a good distance accuracy (when measuring on a single echo) can be obtained with a narrow bandwidth but the possibility to make a distance resolution is closely tied to the frequency bandwidth. With a conventional radar level gauge using 1-1.5 GHz bandwidth the possible distance resolution is 0.2-0.3 m but by using the lower ISM-bands only 0.1-0.15 GHz can be used giving as poor distance resolution as 2-3 m. Under practical circumstances that can also make it difficult to separate the internal antenna echo from the surface echo which is also a problem the invention offers a solution to. It can also be assumed that a typical pulsed system for radar level gauging is difficult to use within a narrow bandwidth because of the diffuse bandwidth limitation of a pulse spectrum will make it hard to keep the out of band radiation below the low limits.

Suitably but not necessarily, the first and second receivers are one and the same physical unit, to which both the first and the second receiving antennas are coupled. One common receiver sequentially connected to different antennas by a suitable switch is another implementation as well as more than one transmitter circuit. From radar systems in other technical fields, the concept "multistatic (or bistatic) radar" is known wherein extra information is gained by having radar receivers (more than one) at very different geographic locations.

The invention also discloses a method for carrying out the steps involved in the device described above.

BRIEF DESCRIPTION OF THE DRAWINGS

The invention will be described in more detail below, with reference to the appended drawings, in which.

EMBODIMENTS

Figure 1:
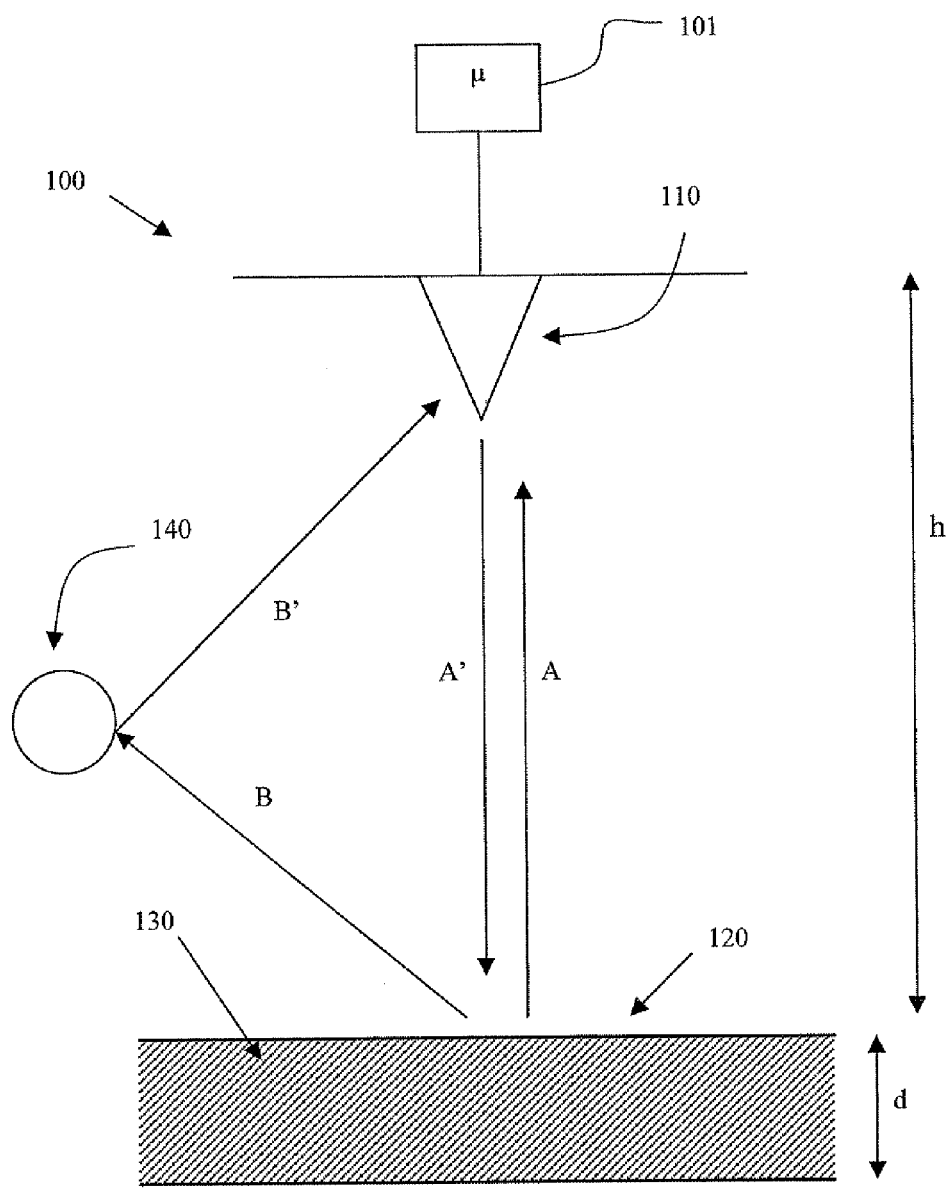
FIG. 1 shows the problem to be solved by the invention.

In FIG. 1 there is shown, in order to further facilitate the understanding of the problem to be solved and of the invention, a basic radar level gauging system 100. The system comprises a transmitter and transmitting antenna for transmitting radar signals, and a receiver and a receiving antenna for receiving radar signals, all symbolically shown as one unit 110. Suitably, but not necessarily, the transmitter and the transmitting antenna are in fact located at the same location as the receiver and receiving antenna. In many applications, one and the same antenna is used both for transmitting and receiving.

The device will also comprise additional units, such as signal processing units, power supply, communication, display and different kinds of environmental sealing arrangements. These are however not shown in FIG. 1, since they are not integral parts of the invention.

The device 100 is intended to measure the distance h from the device to the surface 120 of a material 130 which it might be desired to fill, for example, a metallic tank with. Examples of such materials 130 could be oil or other liquids.

By measuring the distance h to said surface 120, it will be possible to calculate how much of the material 130 that is located in the tank, in order, for example, to know when to stop when filling the tank.

The measurement of the distance from the device 100 to the surface 120 is carried out by transmitting radar energy from the transmitting antenna, and then receiving reflected radar energy at the receiving antenna. The signal path which will be taken by this energy, and which it is desired to measure, is shown with the arrows A-A' in FIG. 1.

Not all of the energy transmitted towards the surface 120 will be reflected back towards the receiving antenna, instead some of the energy will be scattered in other directions. A problem in this kind of measurements is that due to the possible presence of interfering reflecting objects 140 in the vicinity of the surface and/or the receiving antenna, energy which is scattered/reflected in other directions than towards the receiving antenna might encounter such objects 140.

The energy might then be reflected back towards the receiving antenna from the reflecting object 140, taking the path shown with arrows in FIG. 1, and denoted as A-B-B'. It will be realized that this will cause problems for the radar level gauging device, from now on referred to as RLG, as there will now be signals which have traveled two different signal paths present in the receiver.

In radar level gauges in general one typical problem is that a radar echo from a liquid surface is similar to an echo from a disturbing object such a support structure in the tank and thus hard to distinguish. Mistake of one type of echo for another or disturbing of the measurement (locally poor accuracy) are two possible problems frequently experienced in practical systems today. There are three standard methods to decrease the "range of echo competition": the antenna lobe can be made narrow, the distance resolution can be made better (narrow range gate) and various echo characteristics (amplitude, polarization etc.) can be used. A narrow antenna lobe (i.e. less space where disturbing objects are "visible") is in general always desirable but requires a big antenna and short microwave wavelength. The practical choice is however limited since the space generally is limited and the high frequency may be unsuitable because of its inherent sensitivity for dirt on the antenna and foam on the surface. Some echo characteristics (at least amplitude) are always used and U.S. Pat. No. 6,759,976 is one example. Finally the range gate is closely tied to the used bandwidth and with the practical industrial "standard" 2-3 dm is the resolution obtained by the usual 1-1.5 GHz bandwidth. With for instance the ISM-band 2.4-2.5 GHz the resolution would be only 2-3 m which would be a clear disadvantage in most applications. The "resolution" also includes the problem to distinguish the surface echo from the antenna echo if the surface is close to the antenna. Even if there are few disturbing echoes the antenna echo may be a problem and here the invention will also give a solution. An intention with the present invention is to propose a technique which in many cases is a substitute for a large bandwidth.

One solution to suppressing unwanted reflections has been to use systems with a large bandwidth, which makes it possible to use various technologies for suppressing the unwanted signals. However, if there is a need or a desire to use the RLG in applications which are not in enclosed or confined spaces such as metallic tanks, the RLG will need to conform to all relevant regulations regarding bandwidth etc. This might make it impossible to use the bandwidth necessary to achieve the desired suppression. The ISM-bands (2.4-2.5 GHz, 5.725-5.875 GHz etc.) may be used but they are much more narrow (~1/10) than conventional bands for radar level gauging. The invention can be said to use geometrical differences as a substitute for bandwidth to separate different echoes.

Figure 2:
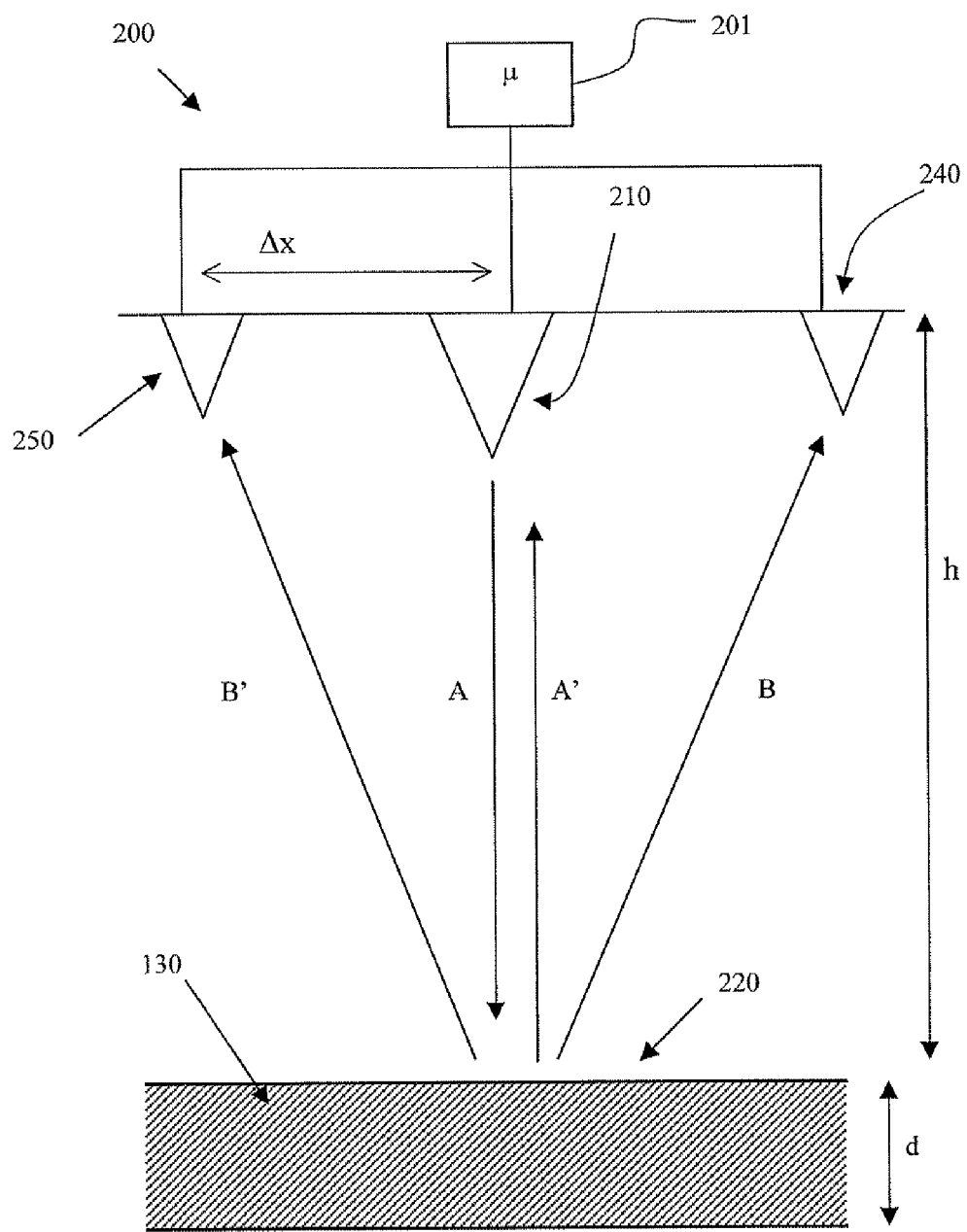
FIG. 2 shows a device according to the invention.

In FIG. 2, a device 200 according to the invention is shown, which can overcome the problem with suppression of undesired signals while using a rather limited signal bandwidth.

As with the device shown in FIG. 1, the device 200 in FIG. 2 comprises a first transmitter and a first transmitting antenna 210 for transmitting radar signals, and a first receiver and a first receiving antenna 210 for receiving a radar signal. Suitably but not necessarily, the first transmitting antenna and the first receiving antenna are arranged at the same location, and can in fact be one and the same physical antenna unit 210. The first transmitter and the first receiver can also be located in one and the same physical unit, suitably relatively close to the respective antenna/antennas. It will be assumed in the following description that the first transmitter and the first transmitting antenna are arranged at one and the same location, together with the first receiving antenna and the first receiver. However, it should be appreciated that this is not necessarily the case, and that the invention can be used in such applications as well.

The device 200 uses the first transmitter and first transmitting antenna to transmit radar signals towards the surface 220 to which it is desired to measure the distance h.

In accordance with the invention, the device 200 additionally comprises at least a second receiving antenna 240 and a second receiver 240, arranged together at a first predetermined horizontal distance $\Delta x$ from the first receiving antenna, which will thus also in this description be the distance to the first transmitting antenna, said two antennas being co-located or in fact being one and the same antenna unit. The distance $\Delta x$ will of course be determined by a variety of parameters, such as the frequency band used and the signal form used, as well as the space available in the location, but a typical and suitable distance is in the area of 0.5 meters. The horizontal distance between the two antennas need to be sufficient to create a distance difference for the radar paths (typically the vertical and the inclined) creating an obvious phase difference between the received signals. If 90° phase difference is required the horizontal distance $\Delta x$ should be in the order of sqrt(h$\lambda$) where h is the distance to the surface and $\lambda$ the radar wavelength. For 10 GHz frequency and 20 m measuring distance we need as an example $\Delta x$ ~0.6 m or bigger.

The second receiving antenna and the second receiver are used for receiving signals which have been transmitted from the first transmitting antenna and then reflected on the surface 220.

Thus, there will now be two alternate "approved" signal paths for signals which are received by the device, the two paths being shown in FIG. 2 by arrows, the first path being denoted as A-A', and the second path denoted as A-B. The signal path A-A' is taken by signals which have been transmitted from the first transmitting antenna, reflected on the surface 220 and received by the first receiving antenna, and the signal path A-B is taken by signals which have been transmitted from the first transmitting antenna, reflected on the surface 220 and received by the second receiving antenna.

Figure 3:
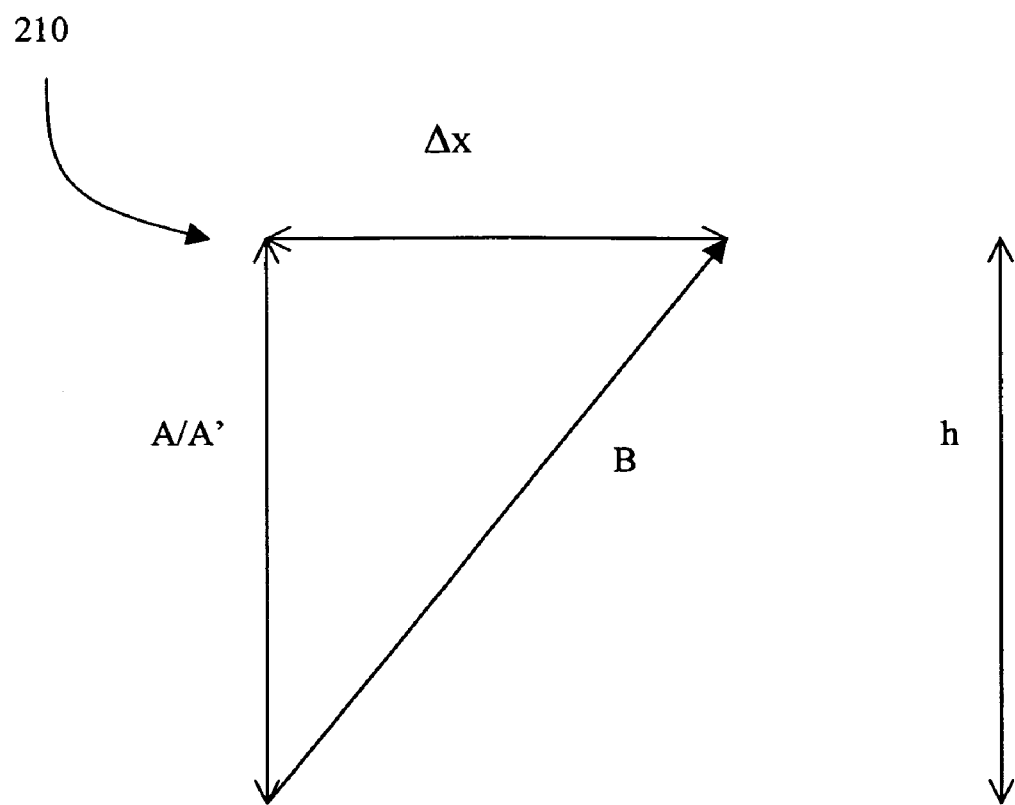
FIG. 3 shows a principle behind the invention.

According to the invention, the device 200 is equipped with means for using radar signals which have been transmitted from the first transmitting antenna and received at the first and second receiving antennas to calculate the vertical distance h to the surface 220. Said calculating means can be in a variety of different designs known to those skilled in the field, designed in hardware or software or a combination of hardware and software, but a principle which can be used by these calculating means is shown in FIG. 3:

The location of the first transmitting antenna is known, as are the locations of the first and second receiving antennas, the first receiving antenna suitably but not necessarily being one and the same as the first transmitting antenna. As shown in FIG. 3, the distance between the first and second receiving antennas is the predefined distance referred to as $\Delta x$ above. The distance h to the surface 220 is not known, but the "permitted" signal paths can be calculated, or rather, since the distance $\Delta x$ is known, the permitted difference between the signal paths A-A' and A-B can be calculated, since the paths A-A', A-B and the distance $\Delta x$ form a triangle, where the length of one side, $\Delta x$, is known, and the angle between that side and one of the other sides, A-A', is also known, said two sides of the triangle being perpendicular to one another.

Another way of looking at the different permitted signal paths is that the desired signal will be one and the same for all of the permitted signal paths, with the exception of a phase difference which will be known. Thus, this information can be used to filter out the desired signal, and also to get information on the position of objects which cause disturbing or interfering reflections.

If the additional receiving antenna is located at the same height over the surface to be measured, the horizontal separation $\Delta x$ can be chosen to give a certain minimum extra phase shift for the longer path compared to the shortest path. The separation $\Delta x$ can for instance be chosen to give more than 90 degrees extra phase shift in the longer path, which would make the two signals easily distinguishable from each other.

Although mention hitherto has only been made of one additional receiver/receiving antenna, FIG. 2 shows two such additional receivers/receiving antennas, 240, 250. Obviously, additional units will enhance the accuracy of the measurements, and the amount of additional units is not limited by the invention.

Another alternative within the scope of the present invention is to equip one or more of the additional units (receivers/receiving antennas) with transmitters, and use the receiving antenna for transmission as well, or to have additional separate transmitting antennas. If all three of the units 210, 240, 250, shown in FIG. 2 transmit as well as receive, there will be a total of three "permitted" signal paths.

Figure 4:
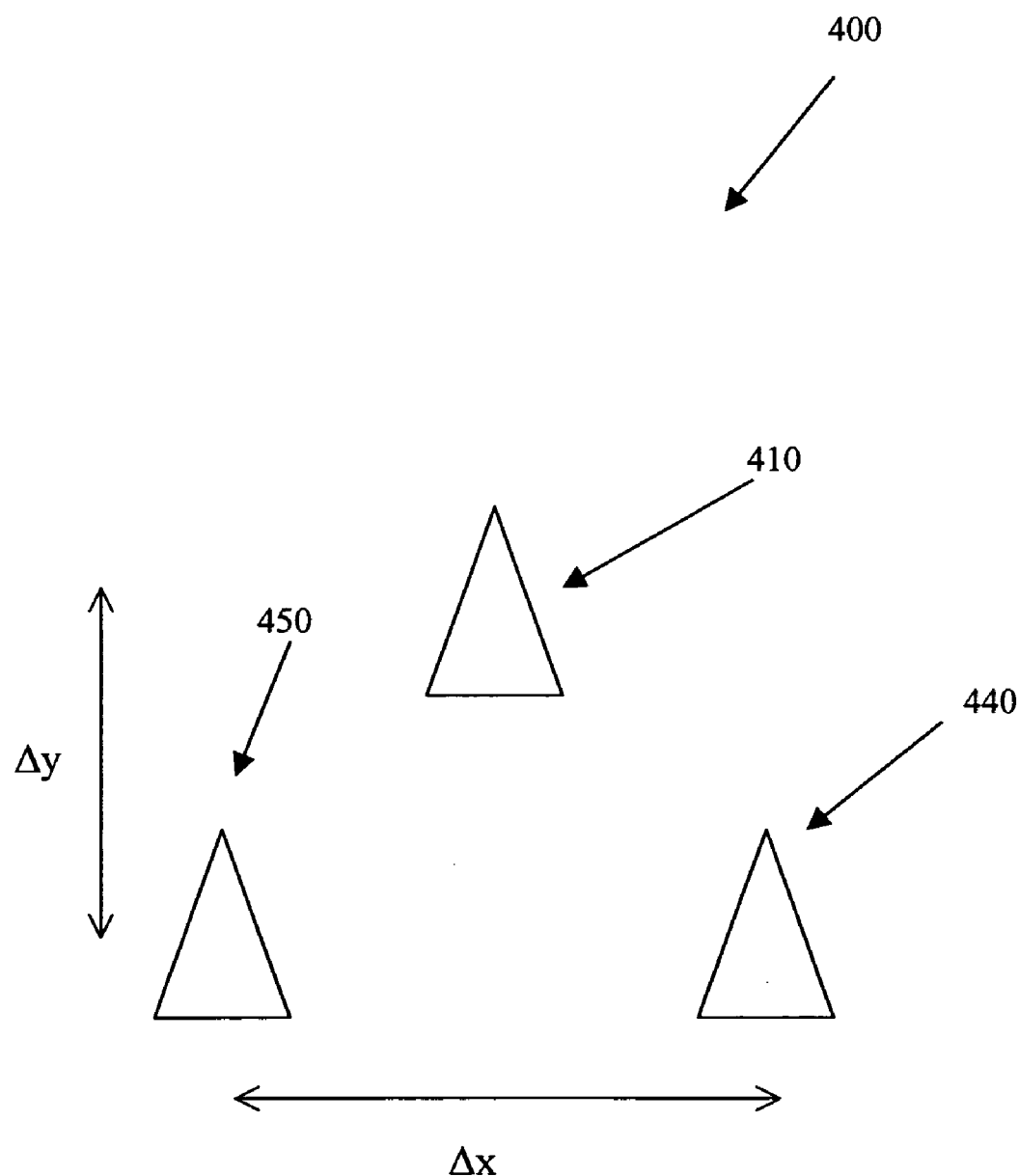
FIG. 4 shows another embodiment of the invention.

In FIG. 4, another possible embodiment 400 of the invention is shown, using three antennas 410, 440, 450 in a triangle, with the distances between the antennas being known, and referred to as $\Delta x$ and $\Delta y$ respectively. One or more of the antennas could be used for transmitting, with all three of the antenna being used for receiving, coupled to individual receivers or one and the same receiver.

In yet a further embodiment, each antenna in the device of the invention could be used for transmitting signals with two different, suitably orthogonal, polarizations. In a device with three antennas, this would create 12 different "permitted" transmission paths.

Another obvious variation would be to use different frequency bands for transmissions from different antenna units.

Figure 5:
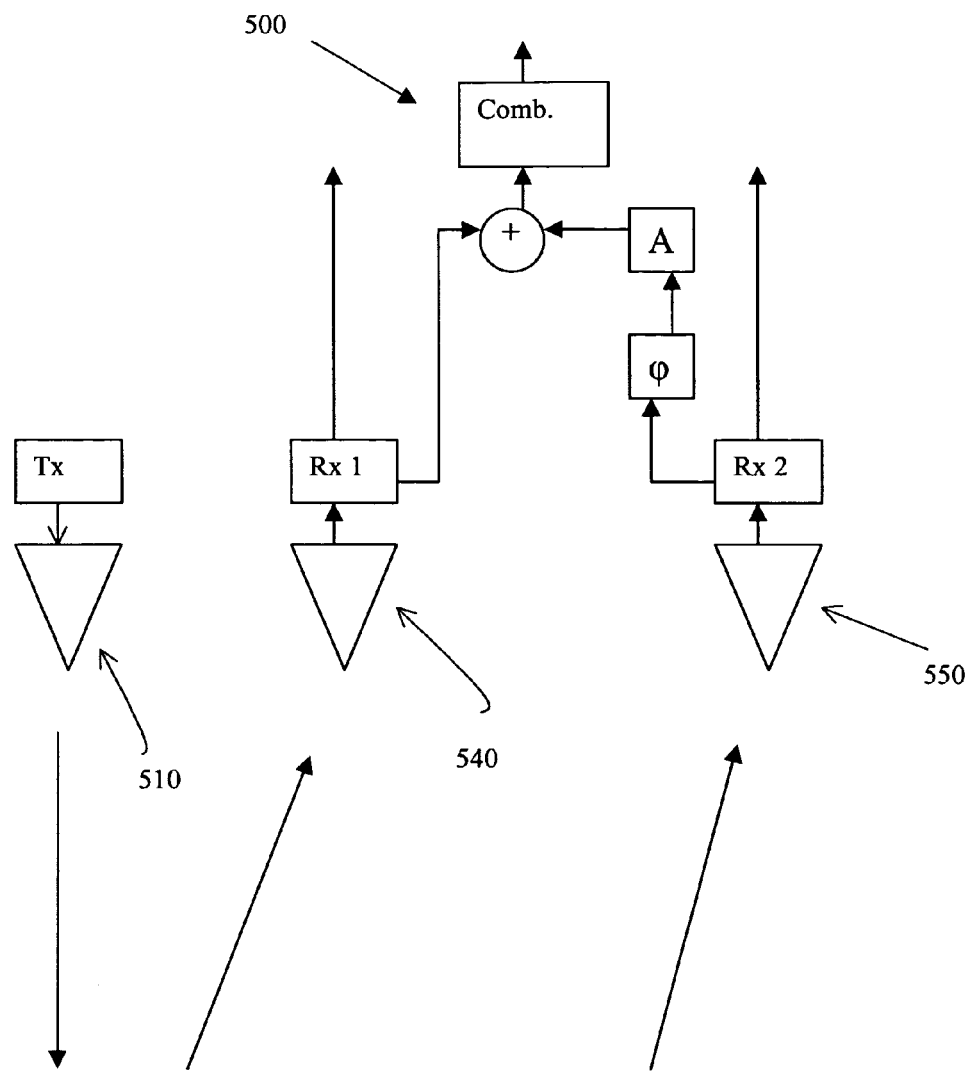
FIG. 5 shows a part of an aspect of the invention.

Finally, FIG. 5 shows a possible embodiment 500 of the means which can be used by the invention in order to use signals which have been transmitted from the first transmitting antenna and received at the first and second receiving antennas to calculate the vertical distance to the surface. It should however be pointed out that the exact embodiment of the means for using the two signals can be varied and is not of crucial importance for the invention.

As shown previously, the device according to the invention comprises one transmitting antenna 510 and two receiving antennas 540 and 550, with a predetermined horizontal distance $\Delta x$ between the two receiving antennas. There will thus be two received signals, Rx1 and Rx2. In addition the device comprises a combined channel, where the signals from Rx1 and Rx2 are both utilized. One of the signals, in the figure Rx2 is phase shifted by a phase shift $\phi$ and then amplified by a factor A, following which the sum of the two signals Rx1 and Rx2 is formed, referred to as "the combination channel".

In all examples so far the hardware has been discussed in terms of "a second antenna with a second receiver" but this should be understood as including cases in which the second receiver is replaced by some kind of microwave switch which connects the second antenna to a common receiver. Most changes of the liquid state are slow in an electronics time scale so a switch and a common receiver would generally be fast enough. Various microwave switching elements are commercially available. FET-switches, PIN-diode switches and MEMS-switches are a few examples.

The phase and amplitude of one of the signals can be varied so as to cancel the echo from the surface, for example by using the fact that the horizontal separation is known, and thus the phase difference between the signals can be estimated. Once the surface echo is cancelled, the signal in the combination channel will provide a good picture of interfering echoes. However, since the interfering echoes may have been suppressed by the operations in the combination channel, a check could be made in Rx1 and/or Rx2 for the strength of those echoes.

Once the location and strength of the objects which cause the interfering echoes have been determined, by means of the described procedure, the phase shift and amplitude in the combination channel can be varied by an automatic control circuit in order to find a combination of phase shift and amplification which will optimally suppress reflections from those objects, and which will thus give the best signal strength for reflections from the surface.

Also, the procedure for cancelling echoes from interfering objects should be repeated at regular intervals, since new interfering objects can appear as the surface level changes.

If the two receiver antennas are arranged symmetric (like in FIG. 2 with a transmitter 210 and two receivers 240/250) the signal processing can be arranged to utilise the much better similarity of the two received wanted surface echoes as compared to less symmetric disturbing echoes. For instance a correlation processing can be used to enhance wanted echo in the signal processing.

Although the invention can be applied to RLG at virtually any frequency band, those frequency bands which at present seem the most viable are the so called ISM-bands (Industrial, Scientific and Medical) in the 140 GHz range. These bands are 2.4-2.5 GHz, 5.725-5.875 GHz and 24.0-24.25 GHz. In many countries 61-61.5 GHz is also recognized as an ISM-band

What is claimed is:

1. A device for using radar signals to measure the vertical distance (h) to a surface from said device, the device comprising:
   a first transmitter and a first transmitting antenna for transmitting radar signals,
   a first receiving antenna for receiving a first reflection of said radar signals,
   a second receiving antenna for receiving a second reflection of said radar signals,
   said second receiving antenna being arranged at a first predetermined horizontal distance ($\Delta x$) from the first receiving antenna,
   at least one receiver for receiving a first signal from said first receiving antenna and a second signal from said second receiving antenna,
   means for using said first signal and said second signal to calculate the vertical distance to the surface; and
   means for suppressing echoes from any interfering objects in favour of reflections from said surface by combining said first and second signals.

2. The device of claim 1, comprising only one receiver, to which both the first and the second receiving antennas are coupled.

3. The device of claim 1, additionally comprising:
   a second transmitter and a second transmitting antenna, said second transmitting antenna being located at a second predetermined horizontal ($\Delta x$) distance from the first receiving antenna and being used for transmitting radar signals towards said surface, the device also being equipped with:
   means for using signals which have been transmitted from at least the first or the second transmitting antennas and received at the first and second receiving antennas to calculate the vertical distance to the surface.

4. The device of claim 3, in which the signals transmitted from the first transmitting antenna have a first polarization, and the signals transmitted from the second transmitting antenna have a second polarization which differs from the first polarization, and the device is equipped with means to distinguish between received signals with said first and second polarizations.

5. The device of claim 1, further being adapted as a part of a system for measuring the level of a substance in an environment which is electromagnetically open to the ambient atmosphere.

6. The device of claim 1, comprising a first receiver coupled to said first receiving antenna, and a second receiver coupled to said second receiving antenna.

7. The device of claim 1, wherein said first predetermined horizontal distance ($\Delta x$) is chosen so that reflections from said surface comprised in said first and second signals are equal except for a predefined phase difference, and wherein said calculating means are arranged to filter out said surface reflection based on said phase difference.

8. The device of claim 7, wherein said calculation means comprises:
   means for phase shifting said second signal,
   means for combining said first signal with said phase shifted signal, to provide a combination signal,
   said phase shift being chosen so that any surface reflection in said combination signal is cancelled, so that said combination signal provides a picture of interfering echoes, and
   means for combining said combination signal with one of said first and second signals to suppress said interfering echoes.

9. A method for using radar signals to measure the vertical distance (h) to a surface, the method comprising:
   transmitting radar signals from a first predetermined transmitting location towards said surface,
   receiving at a first predetermined receiving location a first radar signal reflected from said surface,
   receiving at a second predetermined receiving location a second radar signal reflected from said surface, the second predetermined receiving location being at a first predetermined horizontal distance ($\Delta x$) from the first predetermined transmitting location,
   using said first and second signals to suppress echoes from any interfering objects, and calculate said vertical distance (h) to the surface.

10. The method of claim 9, additionally comprising:
    transmitting radar pulses from a second predetermined transmitting location, said second predetermined transmitting location being located at a second predetermined horizontal ($\Delta x$) distance from the first receiving location, and
    using signals which have been transmitted from the first and second predetermined transmitting locations and received at the first and second predetermined receiving locations to calculate the vertical distance to said surface.

11. The method of claim 10, according to which:
    the signals transmitted from the first transmitting location are given a first polarization, and
    the signals transmitted from the second predetermined transmitting location are given a second polarization which differs from the first polarization, and
    said first and second polarizations are used in order to distinguish between the received signals for calculating the distance to the surface.

12. The method according to claim 9, further comprising:
    phase shifting said second signal,
    combining said first signal with said phase shifted signal to provide a combination signal, said phase shift being chosen so that any surface reflection in said combination signal is cancelled, so that said combination signal provides a picture of interfering echoes, and
    combining said combination signal with one of said first and second signals to suppress said interfering echoes.

* * * * *